United States Patent
Iwamatsu et al.

(10) Patent No.: US 9,007,663 B2
(45) Date of Patent: Apr. 14, 2015

(54) LIGHT IRRADIATION SYSTEM, IMAGE SCANNING APPARATUS, AND IMAGE FORMING APPARATUS

(71) Applicants: Akihiro Iwamatsu, Kanagawa (JP); Tsuyoshi Fujimoto, Kanagawa (JP)

(72) Inventors: Akihiro Iwamatsu, Kanagawa (JP); Tsuyoshi Fujimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/164,439

(22) Filed: Jan. 27, 2014

(65) Prior Publication Data
US 2014/0233077 A1    Aug. 21, 2014

(30) Foreign Application Priority Data
Feb. 19, 2013    (JP) .................................. 2013-030414

(51) Int. Cl.
  *H04N 1/04*    (2006.01)
  *H04N 1/028*    (2006.01)
(52) U.S. Cl.
  CPC ......... *H04N 1/0285* (2013.01); *H04N 1/02855* (2013.01); *H04N 1/02865* (2013.01)
(58) Field of Classification Search
  USPC .......................... 358/475, 474, 498, 1.19, 1.9
  See application file for complete search history.

(56) References Cited

U.S. PATENT DOCUMENTS

2005/0088707 A1    4/2005 Sakurai et al.
2005/0135840 A1*   6/2005 Sakurai et al. ................ 399/211

FOREIGN PATENT DOCUMENTS

| JP | 2005-102112 | 4/2005 |
|---|---|---|
| JP | 2005-252646 | 9/2005 |
| JP | 2007-005860 | 1/2007 |
| JP | 2008-083269 | 4/2008 |
| JP | 2010-219600 | 9/2010 |
| JP | 2011-071608 | 4/2011 |

* cited by examiner

*Primary Examiner* — Houshang Safaipour
(74) *Attorney, Agent, or Firm* — Harness, Dickey & Pierce, P.L.C.

(57) ABSTRACT

An light irradiation system for irradiating light a document face includes a light source; a light guiding member to guide light emitted from the light source; and a reflector to reflect a part of light exiting from the light guiding member to the document face. A direction that emission light intensity of the light emitted from the light source becomes the strongest is different from a direction extending from the light source to an irradiation area. The irradiation area is irradiated by a reflection light reflected by the reflector, and a direct light exiting from the light guiding member without reflection at the reflector. The light guiding member including an incidence surface, an exit surface, and a light guiding part including a total reflection face. Light quantity irradiated to the document face by reflection light is smaller than light quantity irradiated to the document face by direct light.

6 Claims, 6 Drawing Sheets

LIGHT IRRADIATION SYSTEM, IMAGE SCANNING APPARATUS, AND IMAGE FORMING APPARATUS

CROSS-REFERENCE TO RELATED APPLICATION

This application claims priority pursuant to 35 U.S.C. §119 to Japanese Patent Application No. 2013-030414, filed on Feb. 19, 2013 in the Japan Patent Office, the disclosures of which is incorporated by reference herein in their entirety.

BACKGROUND

1. Technical Field

The present invention relates to a light irradiation system of an image scanning apparatus employed for copiers, facsimile machines, image scanners, an image scanning apparatus having the light irradiation system, and an image forming apparatus having the image scanning apparatus.

2. Background Art

Image scanning apparatuses employed for copiers, facsimile machines, and image scanners include a light source that emits a light to a scan target such as a document face placed on a contact glass. The image scanning apparatuses further includes an image scanning unit having a image focus lens for focusing an image of scanning light reflected from the document face and progressing along a scan light axis, and an image capturing element such as a charge coupled device (CCD) that focuses the image of the image of scanning light to scan a document image.

The image scanning apparatuses typically employ a rod-shaped light source such as a fluorescent light and a xenon lamp or a point light source such as a light emitting diode (LED) as the light source. In view of demands for high speed activation, longer life time, and energy saving with respect to the light source, the LED has been replacing the fluorescent light and xenon lamp as the light source.

FIG. 1 is a schematic side view of a light irradiation system of conventional image scanning apparatuses. As shown in FIG. 1, the light irradiation system includes a first moving unit 103, a bracket 121, a circuit board 123, and a light emitting diode (LED) 122. The bracket 121 having a cross-sectional shape of V is attached to the first moving unit 103, the circuit board 123 is attached to the bracket 121, and the LED 122 is attached to the circuit board 123.

Further, the first moving unit 103 is attached with a reflector 118, which is a reflection plate that reflects light coming from the LED 122, to correct irradiation profile, and to eliminate shadow which may occur when scanning a so-called cut-and-paste document.

In conventional image scanning apparatuses employing the light irradiation system shown in FIG. 1, a distance (i.e., light path) from a document face 102 to an image capturing element is relatively long. Therefore, in conventional image scanning apparatuses, attenuation of scanning light between the document face 102 and the image capturing element becomes greater, and therefore, light intensity of the LED 122 is required to be set greater.

As for the LED 122, one single LED has a small light flux amount and a narrower irradiation area. Therefore, in conventional image scanning apparatuses, a plurality of LEDs 122 are arranged in an array pattern in a main scanning direction of document to increase light intensity on the document face 102.

When the plurality of LEDs 122 are arranged in the array pattern, the LEDs 122 are arranged by slanting the LEDs 122 with respect to the document face 102 using the bracket 121 to obtain a preferable irradiation profile in a sub-scanning direction of the document face 102. The irradiation profile in the sub-scanning direction on the document face 102 is preferably set only at an actual scan area on document such as an irradiation area E on the document face 102 shown in FIG. 1.

However, even if the LED 122 is disposed at the slanted position, and an irradiation light from the LED 122 is reflected at the reflector 118 and then directed to the document face 102, some light is irradiated to an area other than the irradiation area E, which can be confirmed by observing the irradiation profile in the sub-scanning direction on the document face 102.

In this case, for example, when a small black solid image surrounded by a white area is scanned, light reflected from the white area existing in the irradiation area E enters an image capturing element. Therefore, in this case, an output value corresponding to the black solid image may be increased, with which the black solid image cannot be reproduced correctly.

SUMMARY

In one aspect the present invention, a light irradiation system is devised. The light irradiation system for irradiating light to an irradiation area extending in a main scanning direction of a document face when placed on an image scanning apparatus includes a light source; a light guiding member to guide light emitted from the light source; and a reflector to reflect a part of light exiting from the light guiding member to the document face. A direction that emission light intensity of the light emitted from the light source becomes the strongest is different from a direction extending from the light source to the irradiation area irradiated by light. The irradiation area is irradiated by a reflection light reflected by the reflector after exiting from the light guiding member, and a direct light exiting from the light guiding member without reflection at the reflector. The light guiding member including an incidence surface where the light from the light source enters; an exit surface where the light entered from the incidence surface exits; and a light guiding part to guide a part of the light entering from the incidence surface to the exit surface. The light guiding part including a total reflection face to totally reflect a part of the light entering from the incidence surface to the irradiation area. Light quantity irradiated to the document face by the reflection light is smaller than light quantity irradiated to the document face by the direct light.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
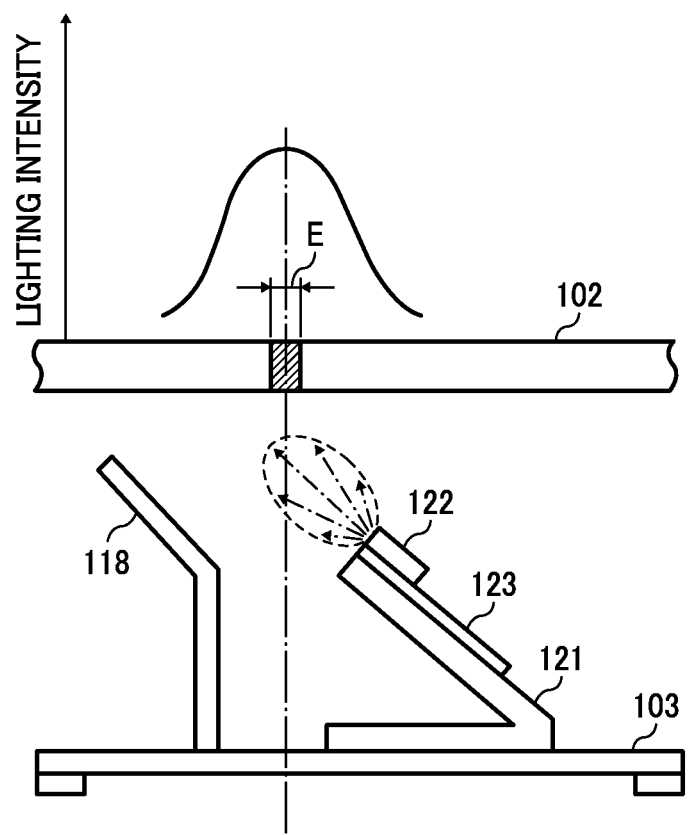
FIG. 1 is a schematic side view of a light irradiation system for conventional image scanning apparatuses.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system for light irradiation, an image scanning apparatus and an image forming apparatus according to an example embodiment are described hereinafter.

(Light Irradiation System)

A description is given of a light irradiation system according to an example embodiment.

Figure 2:
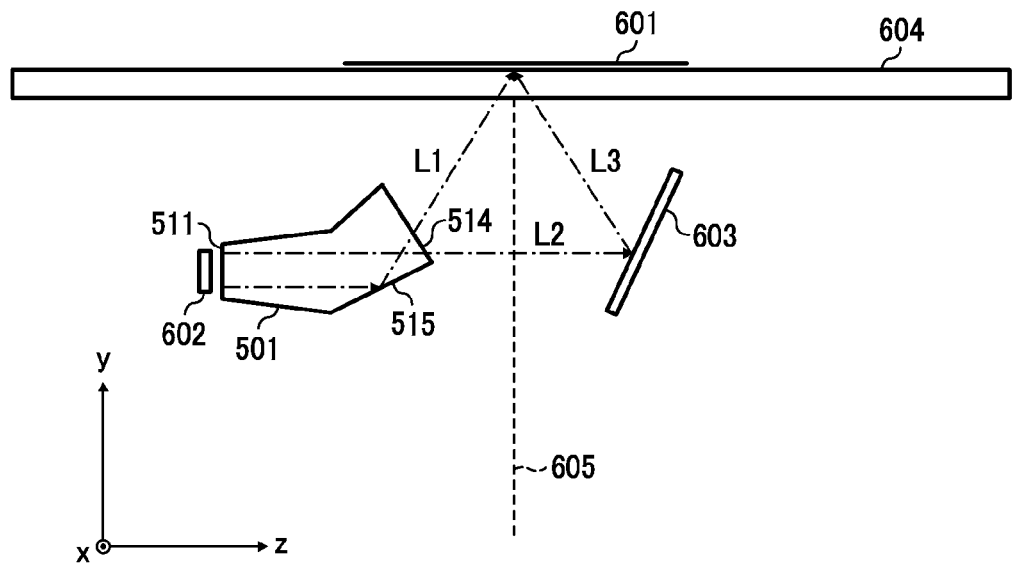
FIG. 2 is a schematic side view of a light irradiation system according to an example embodiment.

FIG. 2 is a schematic side view of a light irradiation system according to an example embodiment. The light irradiation system can be disposed on a first carriage. As shown in FIG. 2, the light irradiation system according to an example embodiment includes, for example, a light source 602, a light guide member 501, and a counter reflector 603.

The light irradiation system irradiates light to a document face 601 placed on a contact glass 604 made of a translucent material such as glass. Specifically, an irradiation area of the document face 601 is irradiated with light by the light irradiation system. The irradiation area of the document face 601 is a line area extending in the main scanning direction, and an optical axis of an optical scan system 605 is aligned to the line area, which means the irradiation area of the document face 601 has a given width in the sub-scanning direction (Z-direction) and is aligned to the optical axis 605 of the optical scan system. In this configuration, the light irradiation system irradiates the irradiation area using light coming from two directions, in which one light (hereinafter, direct light) comes directly from the light guide member 501 to the document face 601 and another light (hereinafter, indirect light) comes to the document face 601 as a reflection light reflecting from the counter reflector 603.

The optical scan system, disposed at a given position on the optical axis 605, receives a part of light reflected and diffused on the document face 601. The center position of the irradiation area (hereinafter, irradiation position) and a point where the optical axis 605 of the optical scan system intersects on the document face 601 are matched or substantially matched.

The up and down direction in FIG. 2 is referred to as the Y-axis direction, the left and right directions in FIG. 2 is referred to as the Z-axis direction, and a direction perpendicular to the Y-axis direction and the Z-axis direction is referred to as the X-axis direction. In FIG. 2, the Z-axis direction corresponds to the sub-scanning direction, wherein light having the strongest intensity is emitted along the sub-scanning direction in an irradiation angle range of the light source 602. Further, the X-axis direction is the main scanning direction perpendicular to the sub-scanning direction.

Further, a coordinate in the Y-axis direction of a position where the direct light directly irradiates the document face 601 from the light guide member 501 and the indirect light that irradiates the document face 601 via the counter reflector 603 intersect is set higher than a surface of the contact glass 604 in +Y-axis direction (upper direction in FIG. 2) for a little. This configuration is applied to irradiate light on the document face 601 effectively even if document comes off from the surface of the contact glass 604.

The light source 602 can employ, for example, point light sources such as LED and laser diode (LD), and rod-shaped light sources such as a fluorescent light and a cold cathode fluorescent lamp (CCFL).

In an example embodiment, the light source 602 uses, for example, a plurality of light emitting elements. Specifically, the light source 602 has a light emitting face having arranged a plurality of light emitting elements such as LEDs in the main scanning direction. The direction that the light intensity (luminous intensity) of light emitting from the light source 602 becomes the strongest is different from a direction extending from the light source 602 to the irradiation area.

The light guide member 501 includes, for example, an incidence surface 511, an exit surface 514, and a light guiding part. Light emitted from the source 602 enters the incidence surface 511. The light entered from the incidence surface 511 exits from the exit surface 514. The light guiding part guides a part of the light entered from incidence surface 511 to the exit surface 514.

The light guiding part includes, for example, side surfaces 512, 513, 516, and a total reflection face 515. The side surfaces 512, 513 and 516 are used to propagate the light entering from incidence surface 511 inside the light guide member

501. The total reflection face 515 totally reflects a part of the light entered from incidence surface 511 toward the irradiation area.

As shown in FIG. 2, the counter reflector 603 is disposed at the opposite side of the light guide member 501 with respect to the optical axis 605 of the optical scan system, and the counter reflector 603 is disposed on the direction that the light intensity of light emitting from the light source 602 becomes the strongest. By irradiating the light to the document face 10 from two directions (i.e., one direction from the light guide member 501 and another direction from the counter reflector 603) with respect to the optical axis 605 of the optical scan system, the light irradiation system according to an example embodiment can prevent an occurrence of shadow on a cut-and-paste document.

Figure 3:
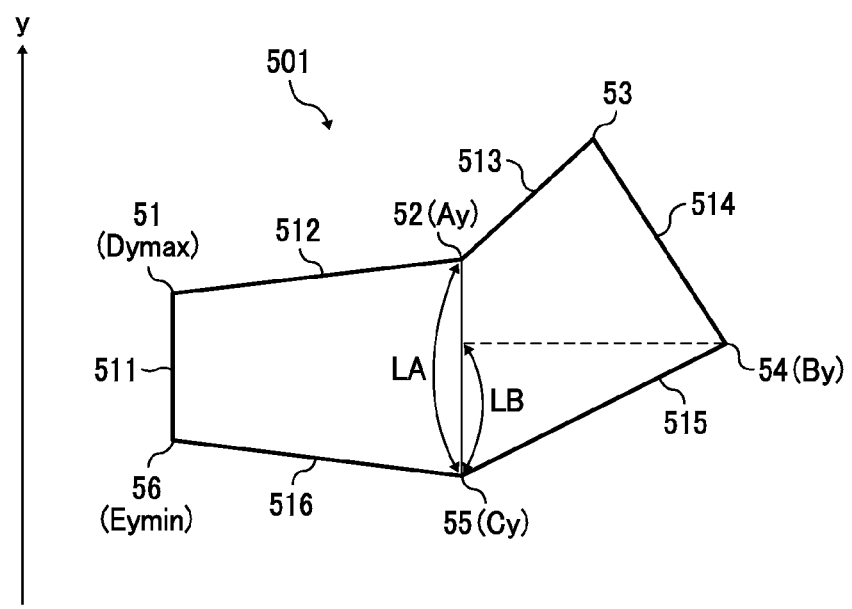
FIG. 3 is a schematic side view of a light guide member of the light irradiation system of FIG. 2.

FIG. 3 is a schematic side view of the light guide member 501 of the light irradiation system according to an example embodiment. The light guide member 501 is a long light guide member, and the long side direction (X-axis direction) of the light guide member 501 corresponds to the main scanning direction.

The light guide member 501 includes six tops 51, 52, 53, 54, 55 and 56 on the YZ plane. The tops 51 and 56 are included in the incidence surface 511. The tops 53 and 54 are included in the exit surface 514. The tops 54 and 55 are included in the total reflection face 515. The tops 51 and 52 are included in the side surface 512. The tops 52 and 53 are included in the side surface 513. The tops 55 and 56 are included in the side surface 516.

Among the six tops 51, 52, 53, 54, 55 and 56 of the light guide member 501, the light guide member 501 has a bending structure which bends toward the document face 601 side at the top 52 and the top 55, in which the total reflection face 515 slants from the top 55 toward the top 54 in a direction toward the document face 601.

Further, in the Y-axis direction in FIG. 3, a position of the Y-axis direction of the top 54 connecting the total reflection face 515 and the exit surface 514 is between the top 51 and the top 56 included in the incidence surface 511 when viewed along the Y-axis direction. The coordinate in the Y-axis direction will be described later.

The side surfaces 512, 513 and 516 and the total reflection face 515 are mirror finished faces. Therefore, as to the light guide member 501, light entered from the incidence surface 511 is totally reflected by the side surfaces 512, 513 and 516, and the total reflection face 515 while propagating inside the light guide member 501. Therefore, the light guide member 501 can guide the incident light entered in the light guide member 501 to the exit surface 514 efficiently without causing a reflection loss of light.

Further, the incidence surface 511 or the exit surface 514 can be disposed with a transparent diffusion structure, having formed with surface texturing or dot pattern, to achieve a standard that the light irradiation system needs to satisfy such as safety standard, and/or to set a desirable light irradiation angle property for the light irradiation system.

A transmission efficiency of a face having the diffusion structure becomes lower than a transmission efficiency of other side surfaces of the light guide member 501 finished as minor face. Therefore, if the light irradiation system is required to have higher light use efficiency, it is not preferable to set the diffusion structure at both of the incidence surface 511 and the exit surface 514. This transmission property also occurs when a diffusion structure of reflection type is disposed on the reflection face.

Therefore, as to the light irradiation system according to an example embodiment, the diffusion structure is preferably disposed on a face that passes or reflects light to be reached to a desired irradiation position on the document face. As to the light guide member 501, the diffusion structure is preferably disposed at any one of incidence surface 511 and the exit surface 514.

In an example embodiment, the diffusion structure is disposed, for example, on the exit surface 514.

The light emitted from the light source 602 enters into the light guide member 501 through the incidence surface 511. The light entered the light guide member 501 exits from the exit surface 514, and is then irradiated to the document face 601, in which the light guide member 501 can be used to divide a light path into two light paths.

The two light paths may be referred to as a first light path and a second light path for the simplicity of the expression. The first light path, which is one of the two paths divided by the light guide member 501, is a path for the light reflected by the total reflection face 515, slanted toward the document face, and is then directly irradiated to the document face 601 by passing through the exit surface 514.

The second light path, which is another path of the two paths divided by the light guide member 501, is not reflected by the total reflection face 515 after entering the light guide member 501, but is irradiated to the counter reflector 603 by passing through the exit surface 514.

The two light paths, which are the divided light paths, can be determined based on a condition whether the light entered the light guide member 501 is irradiated to the total reflection face 515. Specifically, if a ratio of light quantity irradiated to the total reflection face 515 against the light quantity of entire light entering the light guide member 501 through the incidence surface 511 is determined, a ratio between a light quantity of direct light directly irradiated to the document face 601 from the exit surface 514 and a light quantity of indirect light irradiated to the counter reflector 603 can be estimated.

The light quantity irradiated from the incidence surface 511 to the total reflection face 515 can be computed based on a ratio of a projected area of the total reflection face 515 against a projected area of the incidence surface 511 of the light guide member 501 viewed from the Z-axis direction in FIG. 3.

If the light guide member 501 is a long light guide member, which is long in one direction such as the X-axis direction, the above mentioned projected area ratio can be determined as a ratio of projected lengths in the Y-axis direction, wherein the Y-axis direction is perpendicular to a light exiting direction (i.e., Z-axis direction) in a cross-section of the light guide member 50.

Specifically, as to the light guide member 501 of FIG. 3, the projected area of the incidence surface 511 corresponds to a projected length between the top 52 and the top 55 in the Y-axis direction while the projected area of the total reflection face 515 corresponds to a projected length between the top 54 and the top 55 in the Y-axis direction.

In this configuration, light quantity ratio irradiated to the total reflection face 515 can be expressed by the following formula (1).

$$|By-Cy|/|Ay-Cy| \quad (1)$$

Further, light quantity ratio not irradiated to the total reflection face 515 can be expressed by the following formula (2).

$$|Ay-By|/|Ay-Cy| \quad (2)$$

In this configuration, Ay is a coordinate of the top 52 (close to the document face compared to the top 55) in the Y-axis direction, By is a coordinate of the top 54 in the Y-axis direction, and Cy is a coordinate of the top 55 (far from to the document face compared to the top 52) in the Y-axis direction.

Based on the formulas (1) and (2), the light quantity ratio of direct light directly going to the document face 601 at the exit surface 514 can be obtained, and light quantity ratio of light going to the counter reflector 603 at the exit surface 514 can be obtained.

Then, the light quantity ratio of direct light directly irradiated to the document face 601 from the light guide member 501 is computed, and the light quantity ratio of light indirectly irradiated to the document face 601 from the counter reflector 603 is computed.

In general, as to the diffusion light emitted from a LED and light emitted from an exit surface of a light guide member, irradiation intensity per unit area on a virtual screen placed at a given distance from the exit surface attenuates, in which attenuation varies inversely with respect to a square of the distance.

In an example embodiment, it is assumed that light, which enters from the incidence surface 511 but not irradiated to the total reflection face 51, is entirely reflected at the counter reflector 603.

Based on the light quantity ratio of light going to the counter reflector 603 from the exit surface 514, which is obtained by the formulas (1) and (2), the above mentioned attenuation ratio of irradiation light depending on the distance, and the spectral reflectance of the counter reflector 603, the light quantity ratio irradiated to the document face 601 from the counter reflector 603 can be expressed by the following formula (3).

$$(|Ay-By|/|Ay-Cy|)\cdot[L1^2 \times R/(L2^2+L3^2)] \quad (3)$$

In this configuration, L1 is an optical distance between the center of the exit surface 514 and a desired irradiation position on the document face 601. L2 is an optical distance between the center of the exit surface 514 and the center of the counter reflector 603. L3 is an optical distance between the counter reflector 603 and a desired irradiation position on the document face 601. R is the spectral reflectance of the counter reflector 603.

Further, as for the formula (3), transmittance difference at the exit surface 514 due to a difference of exit angles of two directions at the exit surface 514, and transmittance difference due to a difference of incidence angle and exit angle at the contact glass 604 are not considered. However, because these transmittance differences are about several percent, it can be ignored.

effectively eliminate shadow on the document face 601 for cut-and-paste document, the light quantity ratio of indirect light irradiated from the counter reflector 603 is required to be, for example, twenty percent or more of the entire light quantity irradiated to the irradiation area.

Further, to effectively eliminate shadow on the document face 601 for cut-and-paste document, the counter reflector 603 is required to be positioned at the opposite side of the light guide member 501 with respect to the optical axis 605 of the optical scan system.

A relationship of light path length "L1" of direct light irradiating the document face 601 from the exit surface 514 directly and light path length "L2+L3" of indirect light irradiating the document face 601 via the exit surface 514 and the counter reflector 603 becomes "L1<L2+L3."

To increase irradiation light quantity from the counter reflector 603, light quantity in a direction corresponding to a longer propagation distance to the irradiation area is to be increased. As above mentioned, if the propagation distance becomes longer, the light attenuates, with which irradiation light quantity per unit area is decreased.

To prevent attenuation of light quantity for the direction corresponding to the longer propagation distance to the irradiation area, an area of a reflector can be increased, and a shape of the reflector can be changed to a cylindrical concave mirror, but such measures increase the size and cost of the light irradiation system.

Therefore, as to the light irradiation system according to an example embodiment, it is preferable that the light quantity ratio irradiating the document face 601 from the counter reflector 603 is not greater than the light quantity ratio irradiating the document face 601 from the light guide member 501 directly, which means the light quantity ratio of indirect light irradiating the document face 601 from the counter reflector 603 is set 0.5 or less (or fifty percent or less) of the light quantity ratio of direct light irradiating the document face 601 from the light guide member 501 directly. Therefore, it is preferable that light quantity irradiated to the document face 601 by the reflection light from the counter reflector 603 is preferably smaller than light quantity irradiated to the document face 601 from the light guide member 501 directly.

The upper limit of light quantity ratio irradiating the document face 601 from the counter reflector 603 can be expressed by the following formula (3-1) based on the substitution to the formula (3).

$$(|Ay-By|/|Ay-Cy|)\cdot[L1^2 \times R/(L2^2+L3^2)] < 0.5 \quad (3-1)$$

For example, when each parameter of the light irradiation system of FIG. 2 is substituted in the formula (3), a calculation result becomes 0.27. The each parameter is, for example, |Ay−By|=1.05, |Ay−Cy|=2.1, R=0.85, L1=11.0, L2=9.8, L3=9.8.

As for the light irradiation system shown in FIG. 2, an optical simulation is conducted for light beam projection line, in which light quantity irradiated to the document face 601 from the counter reflector 603 against the entire light quantity irradiated to the document face 601 becomes 0.26, which is almost same as the above described calculation result of 0.27.

Further, the above mentioned tops of side surfaces of the light guide member 501 have a following relationship. Specifically, among the tops 51 and 56 of the light guide member 501 included in the incidence surface 511, a coordinate of the top 51 in the Y-axis direction, closer to the document face 601, is set as Dymax.

Further, among the tops of 51 and 56 of the light guide member 501 included in the incidence surface 511, a coordinate of the top 56 in the Y-axis direction, farther from the document face 601 in the Y-axis direction, is set as Eymin.

In this configuration, a relationship of Eymin and Dymax becomes the following formula (4).

$$Ey\mathrm{min} < By < Dy\mathrm{max} \quad (4)$$

Figure 4:
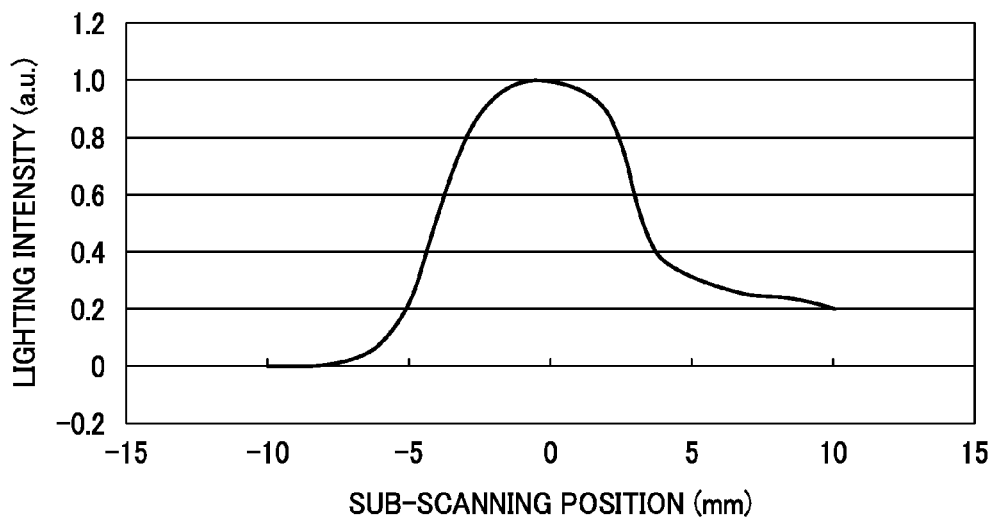
FIG. 4 is an example irradiation profile on a document face in a sub-scanning direction using irradiation light of the light irradiation system.
Figure 5:
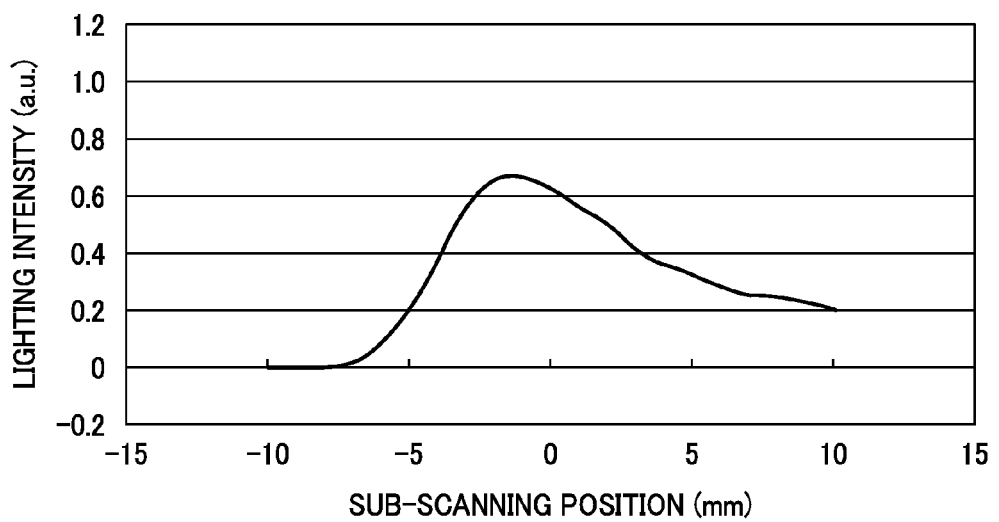
FIG. 5 is an example irradiation profile on a document face in a sub-scanning direction using irradiation light from the light guide member.
Figure 6:
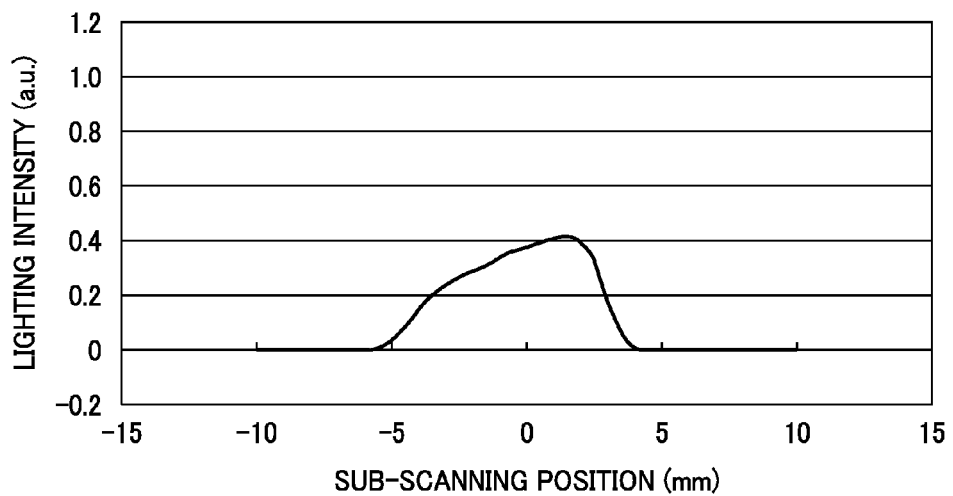
FIG. 6 is an example irradiation profile on a document face in a sub-scanning direction using irradiation light from a counter reflector.

FIG. 4 shows an irradiation profile on the document face 601 in the sub-scanning direction by irradiation light from the light irradiation system. FIG. 5 shows an irradiation profile on the document face 601 in the sub-scanning direction by irradiation light from the light guide member 501. FIG. 6 shows an irradiation profile on the document face 601 in the sub-scanning direction by irradiation light from the counter reflector 603.

Further, the vertical axis of each graph is set by normalizing the maximum value of the entire irradiation profile shown in FIG. 4 as one. Further, the counter reflector 603 is disposed at the plus side in the sub-scanning direction, which means the right side in FIG. 4, FIG. 5, and FIG. 6.

In the above described light irradiation system according to an example embodiment, the document face 601 is irradiated from two directions, in which the direct light is directly irradiated to the document face 601 from the light guide member 501, and the indirect light is irradiated to the document face 601 from the counter reflector 603.

Therefore, as to the light irradiation system according to an example embodiment, the document face 601 can be irradiated with enhanced irradiation efficiency while the irradiation light quantity from the counter reflector 603 can be set at a level enough to prevent occurrence of shadow on the document face 601 when a cut-and-paste document is used.

(Image Scanning Apparatus)

A description is given of an example of an image scanning apparatus according to an example embodiment, in which the image scanning apparatus according to an example embodiment is applied as an image scanner.

Figure 7:
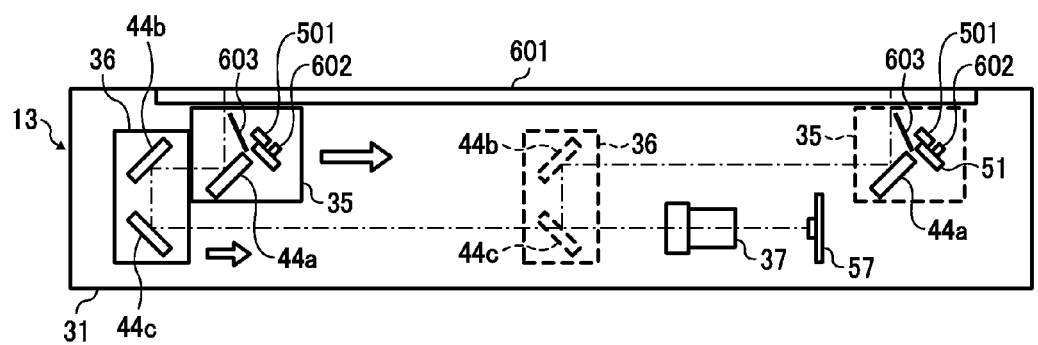
FIG. 7 is a cross-sectional view of an image scanning apparatus in a sub-scanning direction according to an example embodiment.

FIG. 7 is a schematic cross-sectional view of an image scanning apparatus 13 according to an example embodiment, which is cut in the sub-scanning direction. FIG. 7 shows positional relationship between parts of the image scanning apparatus 13.

Figure 8:
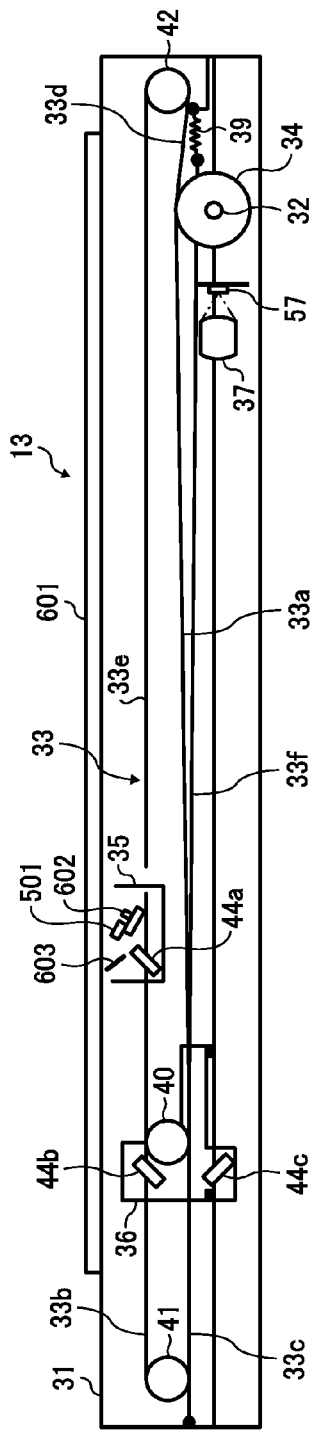
FIG. 8 is a schematic view of a drive wire and a pulley for the image scanning apparatus.
Figure 9:
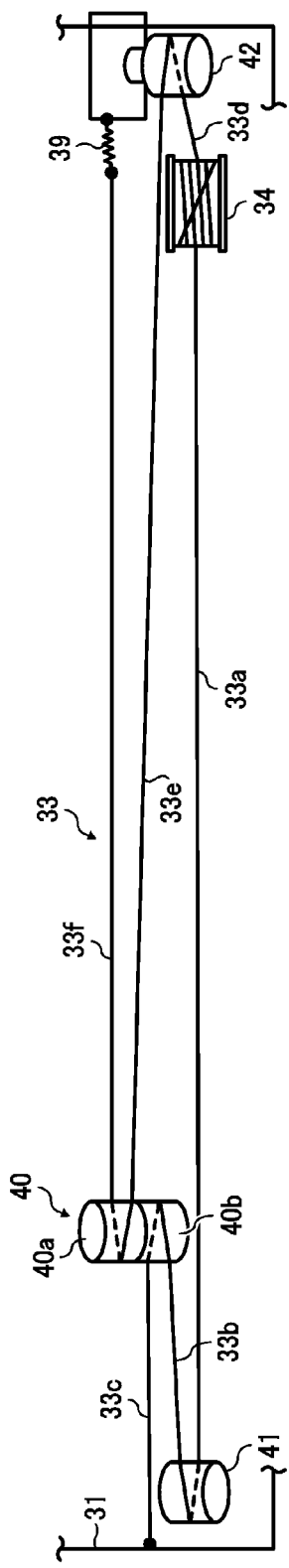
FIG. 9 is a schematic view of a linking condition of the drive wire of FIG. 8.

FIG. 8 is a schematic view of a drive wire and a pulley in the image scanning apparatus 13. Further, FIG. 9 is a schematic view of a linking condition of the drive wire.

In the image scanning apparatus 13, a first carriage 35 and a second carriage 36 can be driven in the left and right directions (sub-scanning direction) in FIG. 7. In the image scanning apparatus 13, light from the light source 602 is irradiated to the document face 601 from the light guide member 501 and the counter reflector 603 as scanning light to scan image information of document placed on the document face 601.

The reflection light reflected by the document face 601 is captured by an image capturing element 57 such as a charge coupled device (CCD) used as a light receiving member via a light condensing member such as a lens unit 37 to condense the reflection light.

As shown in FIG. 8, the image scanning apparatus 13 includes, for example, a main frame 31, a drive axis 32, a drive wire 33, a wire-driven pulley 34, a first carriage 35, and a second carriage 36. Further, the image scanning apparatus 13 includes, for example, the lens unit 37, an extension spring 39, a carriage pulley 40, idler pulleys 41 and 42, and the image capturing element 57.

Further, a first rail and a second rail are disposed in the main frame 31. The first carriage 35, which is a movable unit, is slideably attached on the first rail. Further, the second carriage 36 is slideably attached on the second rail.

The drive axis 32 is linked to a motor. Further, both ends of the drive axis 32 is attached with the wire-driven pulley 34, and the drive wire 33 is wound up along the wire-driven pulley 34.

The drive wire 33 is extended in the left and right directions of FIG. 8 and FIG. 9. The drive wire 33 may use two wires such as one wire for driving the first carriage 35 and one wire for driving the second carriage 36. FIG. 8 and FIG. 9 shows the drive wire 33 used for driving the second carriage 36.

Further, two sets of the drive wire 33 and the idler pulleys 41 and 42 are disposed in the main frame 31, in which one set is disposed at the front side and one set is disposed at the rear side. Because the two set of the drive wire 33 and the idler pulleys 41 and 42 have the same configuration and function, only one set of the drive wire 33 and one of the idler pulleys 41 and 42 is explained.

In the image scanning apparatus 13, two drive wires 33 and four idler pulleys 41 and 42 are disposed at the four corners of the main frame 31.

The second carriage 36 includes the carriage pulley 40. The drive wire 33 is wound up to the carriage pulley 40 and the idler pulleys 41 and 42.

The first carriage 35 includes the light irradiation system according to the above described example embodiment, with which the image scanning apparatus 13 irradiates the document face 601 using two lights coming from the two directions, in which one light (direct light) irradiates the document face 601 directly from the light guide member 501 and another one light (indirect light) coming from the counter reflector 603 irradiates the document face 601.

Therefore, as to the image scanning apparatus 13, the document face 601 can be irradiated with enhanced irradiation efficiency, and irradiation light quantity from the counter reflector 603 can be set at a level enough to prevent occurrence of shadow on the document face 601 when cut-and-paste document is used.

(Image Forming Apparatus)

A description is given of an example of an image forming apparatus according to an example embodiment.

Figure 10:
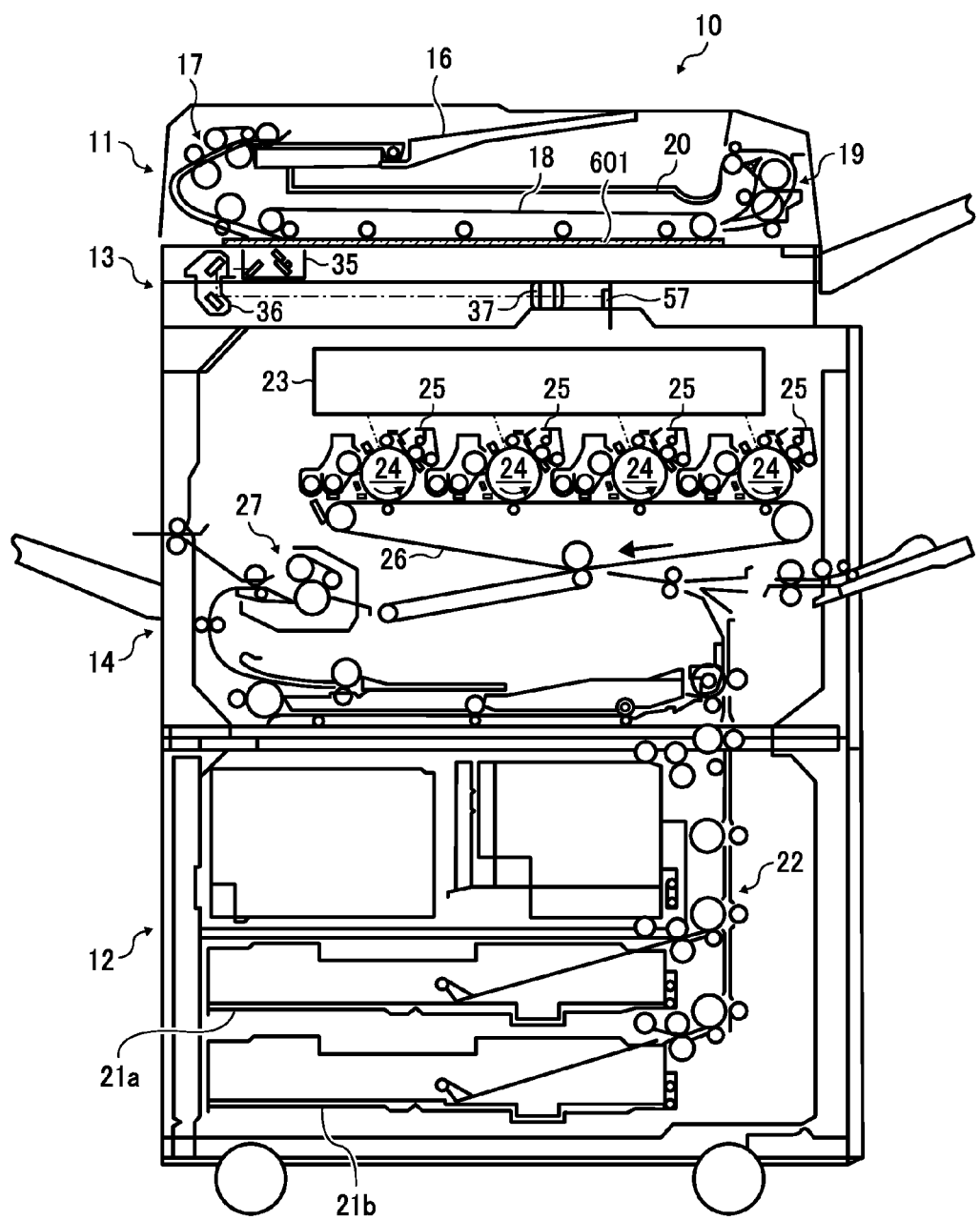
FIG. 10 is a cross-sectional view of an image forming apparatus according to an example embodiment.

FIG. 10 is a schematic cross-sectional view of an image forming apparatus according to an example embodiment, in which the image forming apparatus is, for example a color copier (hereinafter, copier).

Further, the image forming apparatus according to an example embodiment may be a facsimile machine having an image scanner, and multi-functional peripherals (MFPs) having a copy function and a facsimile function.

As shown in FIG. 10, an image forming apparatus 10 includes, for example, an automatic document feeder 11, a sheet feed unit 12, the image scanning apparatus 13, and an image forming unit 14.

The automatic document feeder 11 transports document sheets placed on a document tray 16 to a contact glass, which is a transparent member, using a sheet separation and feed unit 17 having various rollers such as a feed roller and a separation roller.

A transport belt 18 transports scanned document from the contact glass. A sheet ejection unit 19 having various ejection rollers ejects document sheets transported from the transport belt 18 to a sheet ejection tray 20.

Further, when both face of the document is scanned, a branching unit included in the sheet ejection unit 19 and the transport belt 18 are used to return the document to the contact glass to scan not-yet-scanned face.

The sheet feed unit 12 includes, for example, sheet cassettes 21a and 21b and a sheet feeder 22. The sheet cassettes 21a and 21b store recording sheets having different sizes used as recording medium. The sheet feeder 22 having various rollers transports the recording sheets stored in the sheet cassettes 21a and 21b to a transfer position.

The image scanning apparatus 13 includes a configuration of the image scanning apparatus according to the above described example embodiment. In the image scanning apparatus 13, the first carriage 35 having the light irradiation system and the second carriage 36 can be driven in the left and right directions (sub-scanning direction) in FIG. 10, and light emitted from a light source irradiated on the document face 601 as scanning light using a light guide member and a counter reflector.

The scanning light reflected on the document face 601 is captured by the image capturing element 57 such as a CCD via the mirror and the lens unit 37.

The image forming unit 14 includes, for example, an exposure device 23, a photoconductor drums 24, a development device 25, a transfer belt 26, and a fusing device 27.

The exposure device 23 generates writing signals based on scanned signals taken by the lens unit 37. The writing signals generated by the exposure device 23 can be formed on a plurality of photoconductor drums 24.

Each of the development devices 25 is filled with different color toners such as cyan, magenta, yellow, and black toners. Each of the development devices 25 supplies respective color toner to each of the photoconductor drums 24 to develop the writing signal as a toner image.

By transferring the toner images of different color toners from the photoconductor drums 24 to the transfer belt 26 as a superimposed image, a color image is formed on the transfer belt 26. The color image is then transferred to a recording sheet supplied from the sheet feed unit 12. The fusing device 27 fuses the color image on the recording sheet.

In the above described image forming apparatus according to an example embodiment, the document face 601 can be irradiated by the two lights coming from the two directions. in which one light (direct light) irradiates the document face 601 directly from the light guide member and another one light (indirect light) coming from the counter reflector irradiates the document face 601.

Therefore, as to the image forming apparatus according to an example embodiment, the document face 601 can be irradiated with enhanced irradiation efficiency while the irradiation light quantity from the counter reflector can be set at a level enough to prevent occurrence of shadow on the document face 601 when cut-and-paste document is used.

The light irradiation system according to the above described example embodiment can irradiate the document face with enhanced irradiation efficiency while securing enough level of irradiation light quantity to the document face.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A light irradiation system for irradiating light to an irradiation area extending in a main scanning direction of a face of the document when placed on an image scanning apparatus, comprising:
    a light source;
    a light guiding member to guide light emitted from the light source; and
    a reflector to reflect a part of light exiting from the light guiding member to the face of the document,
    wherein a first direction is different from a second direction, the first direction being a direction in which that emission light intensity of the light emitted from the light source is the strongest, the second direction being a direction in which the irradiation area is located relative to the light source,
    wherein the irradiation area is irradiated by a reflection light reflected by the reflector after exiting from the light guiding member, and a direct light exiting from the light guiding member without reflection at the reflector,
    wherein the light guiding member includes,
        an incidence surface where the light from the light source enters;
        an exit surface where the light entered from the incidence surface exits; and
        a light guiding part to guide a part of the light entering from the incidence surface to the exit surface,
    wherein the light guiding part includes a total reflection face to reflect a part of the light entering from the incidence surface to the irradiation area, and
    wherein a quantity of light irradiated to the face of the document by the reflection light is smaller than a quantity of light irradiated to the face of the document by the direct light.

2. The light irradiation system of claim 1, wherein the light guiding member has two bending points,
    wherein among the two bending points, a Y-axis direction coordinate of a bending point close to the face of the document in the Y-axis direction is set as Ay,
    wherein among the two bending points, a Y-axis direction coordinate of a bending point far from the face of the document in the Y-axis direction is set as Cy,
    wherein among tops of the light guiding member included in the exit surface, a Y-axis direction coordinate of a top farthest from the face of the document in the Y-axis direction is set as By,
    wherein an optical distance between the center of the exit surface and the center of the irradiation area is set as L1,
    wherein an optical distance between the center of the exit surface and the reflector is set as L2,
    wherein an optical distance between the reflector and the center of the irradiation area is set as L3,
    wherein a reflectance of the reflector is set as R, and
    wherein a first condition is satisfied, the first condition being defined by the expression $(|Ay-By|/|Ay-Cy|) \cdot \{L1^2 \cdot R/(L2^2+L3^2)\} < 0.5.$ 3. The light irradiation system of claim 2, wherein among tops of the light guiding member included in the incidence surface, a Y-axis direction coordinate of a top closest to the face of the document is set as Dymax,
    wherein among tops of the light guiding member included in the incidence surface, a Y-axis direction coordinate of a top farthest from the face of the document is set as Eymin, and
    wherein Dymax, Eymin and By satisfy an expression $Eymin < By < Dymax.$ 4. The light irradiation system of claim 1, wherein a direction of the reflector relative to the light source is the first direction.

5. An image scanning apparatus comprising:
    the light irradiation system of claim 1;
    a light condensing member to condense a document reflection light, the document reflection light being light that is generated by the light irradiation system and reflected from the face of the document; and
    a light receiving member to receive light condensed by the light condensing member.

6. An image forming apparatus, comprising:
    the image scanning apparatus of claim 5, wherein an image of the document is formed on a recording medium based on the image information scanned with the image scanning apparatus.

* * * * *